(12) United States Patent
Laghate et al.

(10) Patent No.: US 12,063,524 B2
(45) Date of Patent: Aug. 13, 2024

(54) ADJACENT BEAM DETERMINATION

(71) Applicant: QUALCOMM Incorporated, San Diego, CA (US)

(72) Inventors: Mihir Vijay Laghate, San Diego, CA (US); Mingming Cai, San Jose, CA (US); Raghu Narayan Challa, San Diego, CA (US); Michael Burke, Morris Plains, NJ (US); Revathi Sundara Raghavan, San Diego, CA (US); Siddharth Kamath, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/308,871

(22) Filed: Apr. 28, 2023

(65) Prior Publication Data

US 2023/0269604 A1   Aug. 24, 2023

Related U.S. Application Data

(62) Division of application No. 16/890,669, filed on Jun. 2, 2020, now Pat. No. 11,671,846.

(Continued)

(51) Int. Cl.
*H04W 16/28* (2009.01)
*H04B 7/0408* (2017.01)
(Continued)

(52) U.S. Cl.
CPC .......... *H04W 16/28* (2013.01); *H04B 7/0408* (2013.01); *H04B 7/0469* (2013.01); *H04B 7/0617* (2013.01); *H04W 24/10* (2013.01)

(58) Field of Classification Search
CPC .... H04W 16/28; H04W 24/10; H04B 7/0408; H04B 7/0469; H04B 7/0617; H04B 7/0695; H04B 7/088; H04B 7/024
See application file for complete search history.

(56) References Cited

U.S. PATENT DOCUMENTS 10,462,806 B2   10/2019   Zhu et al.
2015/0065140 A1   3/2015   Zhi et al.
(Continued)

FOREIGN PATENT DOCUMENTS

CN   107635273 A   1/2018
CN   108353330 A   7/2018
(Continued)

OTHER PUBLICATIONS

Intel Corporation: "Discussion about L1-RSRP measurement accuracy for beam management", 3GPP TSG-RAN WG4 Meeting #AH07, R4-1808722, Montreal, Canada, Jul. 2-6, 2018, 4 Pages.

(Continued)

*Primary Examiner* — Fred A Casca
(74) *Attorney, Agent, or Firm* — Harrity & Harrity, LLP

(57) ABSTRACT

Various aspects of the present disclosure generally relate to wireless communication. In some aspects, a UE may communicate via a serving beam set of the UE, the serving beam set being one or more of a plurality of beams. The UE may measure another beam set in accordance with a measurement schedule configured to prioritize measurement on one or more adjacent beam sets associated with the serving beam set over one or more non-adjacent beam sets associated with the serving beam set. In some aspects, the one or more adjacent beam sets may be associated with one or more coverage areas that at least partially overlap a coverage area of the serving beam set, are adjacent to the coverage area of the serving beam set, or are associated with a measurement (Continued)

value that satisfies a threshold in the coverage area of the serving beam set. Numerous other aspects are provided.

20 Claims, 7 Drawing Sheets

Related U.S. Application Data

(60) Provisional application No. 62/858,967, filed on Jun. 7, 2019.

(51) Int. Cl.
*H04B 7/0456* (2017.01)
*H04B 7/06* (2006.01)
*H04W 24/10* (2009.01)

(56) References Cited

U.S. PATENT DOCUMENTS

| | | |
|---|---|---|
| 2018/0048375 A1 | 2/2018 | Guo et al. |
| 2018/0115958 A1* | 4/2018 | Raghavan ......... H04L 25/03904 |
| 2019/0081688 A1 | 3/2019 | Deenoo et al. |
| 2019/0253128 A1 | 8/2019 | Moon et al. |
| 2019/0319686 A1 | 10/2019 | Chen, IV et al. |
| 2020/0389800 A1 | 12/2020 | Laghate et al. |
| 2021/0176096 A1 | 6/2021 | Shimoda et al. |
| 2022/0060854 A1* | 2/2022 | Liu ....................... H04W 4/025 |
| 2022/0060857 A1* | 2/2022 | Herschfelt ............ G01S 5/0009 |
| 2022/0095177 A1 | 3/2022 | Han et al. |

FOREIGN PATENT DOCUMENTS

| | | |
|---|---|---|
| CN | 108781103 A | 11/2018 |
| CN | 109076408 A | 12/2018 |
| CN | 109391310 A | 2/2019 |
| WO | 2017196491 A1 | 11/2017 |
| WO | 2018084776 A1 | 5/2018 |

OTHER PUBLICATIONS

International Preliminary Report on Patentability—PCT/US2020/035919 The International Bureau of WIPO—Geneva, Switzerland, Dec. 16, 2021.
International Search Report and Written Opinion—PCT/US2020/035919—ISA/EPO—Jan. 22, 2021.
Nokia, et al., "On Beam Grouping and Reporting", 3GPP TSG-RAN WG1 Meeting #88bis, 3GPP Draft, R1-1705959, 3rd Generation Partnership Project (3GPP), Mobile Competence Centre, 650, Route Des Lucioles, F-06921 Sophia-Antipolis Cedex, France, vol. RAN WG1, No. Spokane, WA, USA, Apr. 3, 2017-Apr. 7, 2017, Apr. 2, 2017 (Apr. 2, 2017), 12 Pages, XP051244068, p. 1-p. 3, Figure 1 p. 8.
Partial International Search Report—PCT/US2020/035919—ISA/EPO—Oct. 7, 2020.

* cited by examiner

ADJACENT BEAM DETERMINATION

CROSS-REFERENCE TO RELATED APPLICATION

This application is a divisional of U.S. patent application Ser. No. 16/890,669, filed on Jun. 2, 2020, entitled "ADJACENT BEAM DETERMINATION," which claims priority to U.S. Provisional Patent Application No. 62/858,967, filed on Jun. 7, 2019, entitled "ADJACENT BEAM DETERMINATION," the contents of which are incorporated herein by reference in their entireties.

TECHNICAL FIELD

Aspects of the technology described below generally relate to wireless communication and to techniques and apparatuses for adjacent beam determination. Some techniques and apparatuses described herein enable and provide wireless communication devices and systems configured for efficient radio component usage.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). A wireless communication network may include a number of base stations (BSs) that can support communication for a number of user equipment (UEs). A user equipment (UE) may communicate with a base station (BS) via the downlink and uplink, for example, using beams (e.g., beam pairs, beam sets, and/or the like). The downlink (or forward link) refers to the communication link from the BS to the UE, and the uplink (or reverse link) refers to the communication link from the UE to the BS. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

Some radio access technologies, such as 5G/NR, may use high-frequency communications, such as millimeter wave (mm Wave), to improve throughput. Millimeter wave channels may suffer from high propagation loss. Thus, a wireless communication device (e.g., a UE or base station) may use beamforming to improve channel gain. The wireless communication device may generate a beam set (e.g., one or more beams) to transmit or receive information. When the wireless communication device rotates or the environment changes, the wireless communication device may need to identify a best beam set to use as a serving beam set by performing measurements on beam sets other than a serving beam set. In other words, the wireless communication device may track the best beam set for receiving or transmitting a signal, and may switch from a prior serving beam set to a best beam set based at least in part on a change in conditions at the wireless communication device. A serving beam set refers to a beam set used for uplink or downlink communication with a base station. Serving beams may in some instances refer to beams being used in active communication links. As the wireless communication device rotates or the environment changes, the serving beam set may need to be updated so that the uplink or downlink communication can continue. As used herein, a serving beam set refers to one or more beams generated by the wireless communication device, such as one or more receive beams for downlink communication or one or more transmit beams for uplink communication.

However, it may be inefficient to perform such measurements in an random way or without prioritizing geometric relationships or coverage areas of the beams of the beam sets, as some beam sets are less likely than others to be best beam sets for the wireless communication device. Furthermore, if such measurements are performed considering only the geometric relationships of the beams of the beam sets (e.g., whether a beam is spatially adjacent to or geometrically proximate to a serving beam set), and not coverage areas of the beam sets, then the measurements may be inefficient, since a beam set that is geometrically (e.g., angularly) proximate to a serving beam set may not necessarily be the mostly likely beam set to be selected as a new serving beam set.

Some techniques and apparatuses described herein identify one or more beam sets as adjacent beam sets for a serving beam set of a UE. For example, some techniques and apparatuses described herein receive measurement information for the UE, identify coverage areas of beam sets, identify beam sets of a same class as a serving beam set, and select one or more beam sets as adjacent beam sets based at least in part on the coverage areas and the classes. An adjacent beam set, as described herein, is defined based at least in part on respective coverage areas of the adjacent beam set and a corresponding serving beam set, as described in more detail elsewhere herein. An adjacent beam set may comprise one or more beams that are, or are not, spatially or geometrically proximate to the beams of a serving beam set. In other words, the adjacent beam set's beams need not be spatially or geometrically proximate to or adjacent to the serving beam set's beams. The UE may perform measurement on the adjacent beam sets before the non-adjacent beam sets. Thus, the likelihood of identifying a suitable beam set in an expedient fashion is improved, thereby reducing delay associated with identifying suitable beam sets and improving UE performance.

In some aspects, a method of wireless communication can be performed by a device. The method may include receiving measurement information pertaining to a measurement for a plurality of beams generated by a user equipment (UE). The method can include identifying a coverage area of a selected beam set of the plurality of beams based at least in part on the measurement information. The method can also include identifying a group of adjacent beam sets associated with the selected beam set. Identification may be based at least in part on the coverage area and based at least in part on respective coverage areas of the group of adjacent beam sets. One or more groups of adjacent beam sets can include one or more beams of the plurality of beams. And the method may also include providing information indicating that the group of adjacent beam sets are associated with the selected beam set.

In some aspects, a method of wireless communication can be performed by a UE. The method may include communicating via a serving beam set of the UE. A serving beam set can be one or more beams of a plurality of beams. A method can also include measuring another beam set in accordance with a measurement schedule. A measurement schedule can prioritize measurement on one or more adjacent beam sets associated with the serving beam set over measurement on one or more non-adjacent beam sets associated with the serving beam set. In some scenarios, for example, a measurement schedule can prioritize measurements on one or more adjacent beam sets associated with the serving beam set over the measurement of one or more non-adjacent beam sets associated with the serving beam set. The one or more adjacent beam sets may be associated with one or more coverage areas that at least partially overlap a coverage area of the serving beam set, or may be adjacent to a coverage area of the serving beam set. In some aspects, the one or more adjacent beam sets may be associated with a measurement value that satisfies a threshold in the coverage area of the serving beam set.

In some aspects, a UE for wireless communication may include memory and one or more processors operatively coupled to the memory. The memory and the one or more processors may be configured to communicate via a serving beam set of the UE. A serving beam set may be one or more beams of a plurality of beams. The memory and the one or more processors may be configured to measure another beam set in accordance with a measurement schedule. The measurement schedule may be configured to prioritize measurement on one or more adjacent beam sets associated with the serving beam set over measurement on one or more non-adjacent beam sets associated with the serving beam set. In some scenarios, for example, the measurement schedule prioritizes measurements on one or more adjacent beam sets associated with the serving beam set over the measurement on one or more non-adjacent beam sets associated with the serving beam set. The one or more adjacent beam sets may be associated with one or more coverage areas that at least partially overlap a coverage area of the serving beam set, or may be adjacent to a coverage area of the serving beam set. In some aspects, the one or more adjacent beam sets may be associated with a measurement value that satisfies a threshold in the coverage area of the serving beam set.

In some aspects, a device for wireless communication may include memory and one or more processors operatively coupled to the memory. The memory and the one or more processors may be configured to receive measurement information pertaining to a measurement for a plurality of beams generated by a UE. The memory and the one or more processors may be configured to identify a coverage area of a selected beam set of the plurality of beams based at least in part on the measurement information. The memory and the one or more processors may be configured to identify a group of adjacent beam sets associated with the selected beam set based at least in part on the coverage area and based at least in part on respective coverage areas of the group of adjacent beam sets. In some aspects, the group of adjacent beam sets includes one or more beams of the plurality of beams. The memory and the one or more processors may be configured to provide information indicating that the group of adjacent beam sets are associated with the selected beam set.

In some aspects, a non-transitory computer-readable medium may store one or more instructions for wireless communication. The one or more instructions, when executed by one or more processors of a UE, may cause the one or more processors to communicate via a serving beam set of the UE. In some aspects, the serving beam set may be one or more beams of a plurality of beams. The one or more instructions, when executed by one or more processors of a UE, may cause the one or more processors to measure another beam set in accordance with a measurement schedule that is configured to prioritize measurement on one or more adjacent beam sets associated with the serving beam set over measurement on one or more non-adjacent beam sets associated with the serving beam set. In some aspects, the one or more adjacent beam sets are associated with one or more coverage areas that at least partially overlap a coverage area of the serving beam set or are adjacent to a coverage area of the serving beam set. In some aspects, the one or more adjacent beam sets are associated with a measurement value that satisfies a threshold in the coverage area of the serving beam set.

In some aspects, a non-transitory computer-readable medium may store one or more instructions for wireless communication. The one or more instructions, when executed by one or more processors of a device, may cause the one or more processors to receive measurement information pertaining to a measurement for a plurality of beams generated by a UE. In some aspects, the one or more instructions, when executed by one or more processors of a device, may cause the one or more processors to identify a coverage area of a selected beam set of the plurality of beams based at least in part on the measurement information. The one or more instructions, when executed by one or more processors of a device, may also cause the one or more processors to identify a group of adjacent beam sets associated with the selected beam set based at least in part on the coverage area and based at least in part on respective coverage areas of the group of adjacent beam sets. In some aspects, the group of adjacent beam sets includes one or more beams of the plurality of beams. In some aspects, the one or more instructions, when executed by one or more processors of a device, may cause the one or more processors to provide information indicating that the group of adjacent beam sets are associated with the selected beam set.

In some aspects, an apparatus for wireless communication may include means for receiving measurement information pertaining to a measurement for a plurality of beams generated by a UE. The apparatus may include means for identifying a coverage area of a selected beam set of the plurality of beams based at least in part on the measurement information. In some aspects, the apparatus includes means for identifying a group of adjacent beam sets associated with the selected beam set based at least in part on the coverage area and based at least in part on respective coverage areas of the group of adjacent beam sets. In some cases, the group of adjacent beam sets includes one or more beams of the plurality of beams. The apparatus may include means for providing information indicating that the group of adjacent beam sets are associated with the selected beam set.

In some aspects, an apparatus for wireless communication may include means for communicating via a serving beam set of the apparatus. The serving beam set may be one or more beams of a plurality of beams. The apparatus may include means for measuring another beam set in accordance with a measurement schedule that is configured to prioritize measurement on one or more adjacent beam sets associated with the serving beam set over measurement on one or more non-adjacent beam sets associated with the serving beam set. In some aspects, the one or more adjacent beam sets are associated with one or more coverage areas that at least partially overlap a coverage area of the serving beam set, or are adjacent to a coverage area of the serving beam set. In some aspects, the one or more adjacent beam sets are associated with a measurement value that satisfies a threshold in the coverage area of the serving beam set.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being exemplarily illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
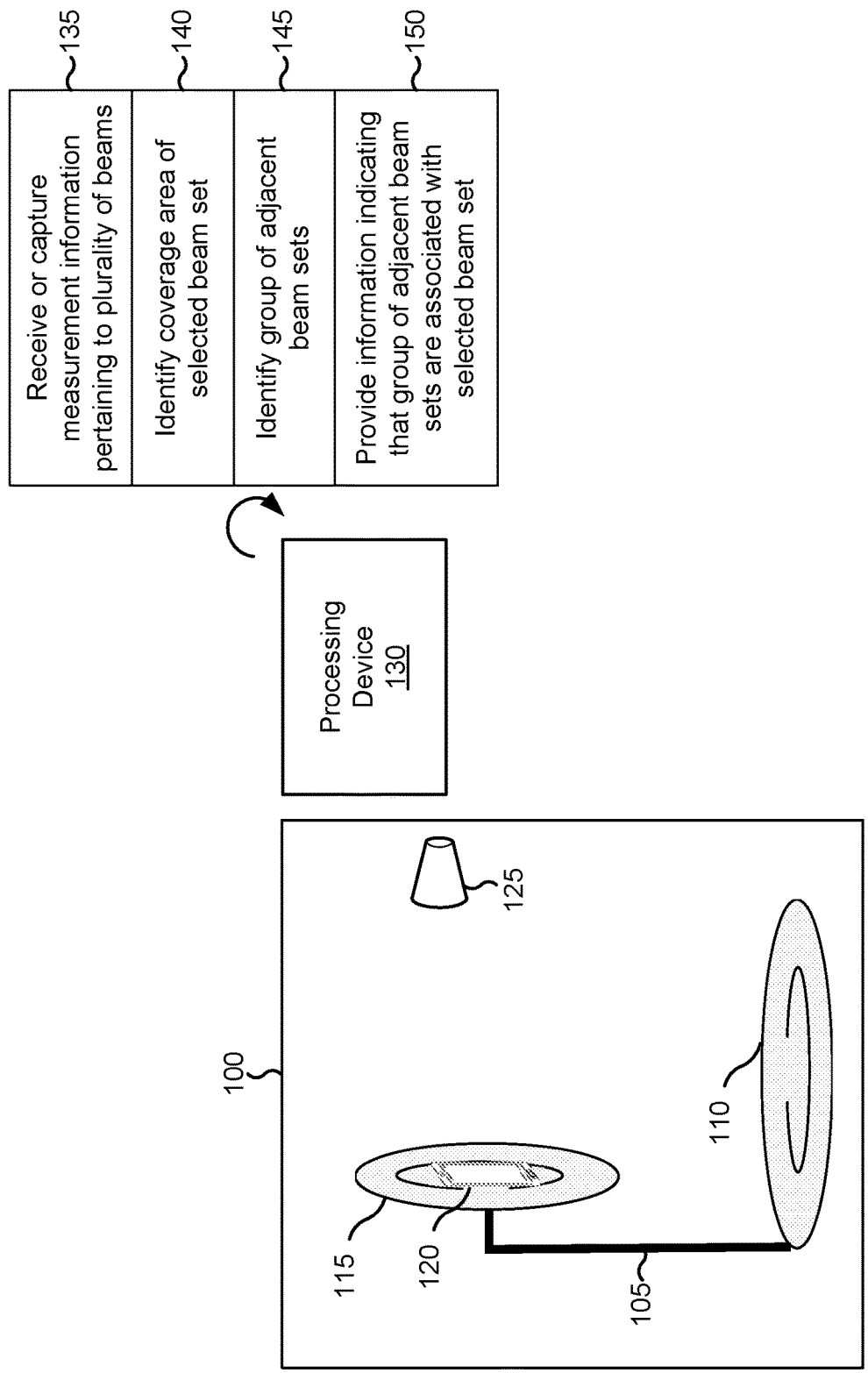
FIG. 1 is a block diagram conceptually illustrating an example of a testing system and an adjacent beam determination using the testing system, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency chains, power amplifiers, modulators, buffers, processors, interleavers, adders/summers, and/or the like). It is intended that innovations described herein may be practiced in a wide variety of devices, chip-level components, systems, distributed arrangements, end-user devices, etc., of varying sizes, shapes, and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, or may be within the EHF band.

FIG. 1 is a block diagram conceptually illustrating an example of a testing system 100 and an adjacent beam determination using the testing system 100, in accordance with various aspects of the present disclosure. As shown, the testing system 100 includes a positioner 105 with a lower platter 110 and an upper platter 115 to which a UE 120 (e.g., a wireless communication device) is mounted, a measurement horn 125, and a processing device 130. In some aspects, the processing device 130 may be separate from the testing system 100.

The testing system 100 may include, for example, a testing chamber (e.g., a near-field testing chamber or another type of testing chamber), an antenna test range, a compact antenna test range (CATR), and/or the like. The testing system 100 may perform testing of an electric field generated by the UE 120. For example, the measurement horn 125 may determine amplitude measurement values, phase measurement values, and/or the like, regarding the electric field. The measurement horn 125 may be capable of measurement at a single polarization or at multiple polarizations. The positioner 105 may position the UE 120 by rotating the UE 120 around a first axis (e.g., by rotating the lower platter 110, thereby rotating the UE 120 around a longitudinal axis of the UE 120) and/or around a second axis (e.g., by rotating the upper platter 115, thereby rotating the UE 120 around an axis normal to the plane of the UE 120). By rotating the UE 120 to a variety of positions and/or by mounting the UE 120 in a variety of orientations, a complete measurement of the electric field generated by the UE 120 may be achieved. This may provide information regarding performance of beams of the UE 120, coverage areas of the beams, coverage holes of the beams, and/or the like.

A UE 120, also referred to herein as a wireless communication device or a device under test (DUT), may communicate using beams, such as transmit beams and receive beams. A beam may be generated using a spatial filter applied to an antenna group (e.g., a set of antennas, an antenna array, an antenna sub-array, and/or the like) to transmit a signal in a particular direction (using a transmit beam) or receive a signal from a particular direction (using a receive beam). Beams may improve radio performance relative to omni-directional or pseudo-omni-directional transmission. During operations, a UE 120 may need to switch from one beam or beam set to another beam or beam set due to movement of the UE 120, changing environmental conditions, changing clusters, and/or the like. In some scenarios, this switching may occur over a range of switching rates, with some operational environments providing higher or lower switching rates.

A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, robotics, drones, implantable devices, augmented reality devices, a global positioning system device, or any other suitable device that is configured to communicate via a wireless or wired medium.

UE 120 may be included inside a housing that houses components of UE 120. In such an arrangement, the housing may define one or more external walls and create internal areas configured for carrying or holding components. These components may include processor components, memory components, and/or the like, which are described in connection with FIG. 2. These components may be integrated in a variety of combinations and/or may be stand-alone, distributed components, considering design constraints and/or operational preferences.

The processing device 130 may include a cloud computing platform, a server, a desktop computer, a laptop computer, a network controller, a gNB, and/or the like. The processing device 130 may receive or capture measurements regarding the electric field of the UE 120 and may determine adjacent beam sets based at least in part on the measurements. In some aspects, the processing device 130 may generate and/or provide a codebook based at least in part on the adjacent beam sets, as described below. The processing device 130 may be implemented using a device local to the testing system 100 or a device remote from the testing system 100 (e.g., using a cloud computing system, an edge computing system, and/or the like).

As shown in FIG. 1, and by reference number 135, the processing device 130 may receive or capture measurement information pertaining to a plurality of beams generated by the UE 120. For example, the measurement information may identify measurements for the plurality of beams. The plurality of beams may include receive beams and/or transmit beams. The measurements may include, for example, phase measurements at one or more polarizations, magnitude measurements at one or more polarizations, array gain measurements at one or more polarizations, beamforming gain measurements at one or more polarizations, and/or the like.

In some aspects, the measurement information may pertain to individual beams (corresponding to individual radio frequency (RF) ports). For example, the processing device 130 may capture measurement information identifying an electric field associated with each individual beam that can be generated by the UE 120. In some aspects, the measurement information may pertain to beam sets (corresponding to groups of RF ports), such as beam pairs, beam trios, or larger groups of beams. As an example, if the UE 120 is capable of generating beams [1, 2, 3, 4], and if the measurement information pertains to beam pairs, then the processing device 130 may capture measurement information for any one or more of: [1_2, 1_3, 1_4, 2_1, 2_3, 2_4, 3_4], where 1_2 denotes a beam pair of beams 1 and 2.

As shown by reference number 140, the processing device 130 may identify a coverage area of a selected beam set. For example, the processing device 130 may select a beam set for which the processing device 130 is to determine adjacent beam sets, and may identify a coverage area of the selected beam set. While many of the operations described herein are described with reference to a single beam set, it should be understood that the operations described herein can be applied for multiple beam sets. For example, the processing device 130 may identify adjacent beam sets for multiple beam sets of the UE 120, for all beam sets of the UE 120, and/or the like.

A coverage area may be an area in which a beam set provides radio frequency performance that satisfies a threshold. For example, if the electric field around the UE 120 is represented as a sphere, the coverage area of a beam set may be an area on the sphere in which a measurement associated with the beam set satisfies a coverage area threshold. A coverage area threshold may refer to a performance threshold for a coverage area, such as a threshold reference signal received power, a threshold electrical field, and/or the like. In some aspects, the processing device 130 may identify a coverage area of a beam set based at least in part on a measurement, such as a beamforming gain or array gain, a combining gain, a magnitude, a phase, a beam width, a side lobe existence (e.g., whether a beam set is associated with one or more side lobes), a direction of a beam set, a directivity, a coverage area, a combination of two or more of these measurements, and/or the like. In some aspects, the processing device 130 may identify a coverage area of a beam set based at least in part on a physical constraint, such as geometry of the UE 120 and/or the like. In some aspects, the processing device 130 may identify the coverage area based at least in part on a combination of a measurement and a physical constraint. The coverage area threshold used to determine the coverage may be configurable by an operator of the processing device 130, or may be determined by the processing device 130, for example, based at least in part on a maximum transmit power of the UE 120 and/or the like.

In some aspects, the processing device 130 may identify a class of one or more beams of the plurality of beams generated by the UE 120. For example, the processing device 130 may classify beams generated by the UE 120 based at least in part on beam width, performance, power consumption, and/or the like. By classifying the beams, the processing device 130 may improve uniformity between selected beam sets and adjacent beam sets, since the processing device 130 can select adjacent beam sets from a same class as the selected beam set.

As shown by reference number 145, the processing device 130 may identify a group of adjacent beam sets. For example, the processing device may identify one or more adjacent beam sets for the selected beam set. The one or more adjacent beam sets may be selected from the plurality of beams generated by the UE 120. An adjacent beam set, for a selected beam set, may be expected to be a next-best beam set when the selected beam set is a serving beam set. For example, when the selected beam set is a serving beam set, the group of adjacent beam sets may include beam sets that are likely to become serving beam sets as the UE 120 moves, as conditions around the UE 120 change, and/or the like.

The processing device 130 may identify an adjacent beam set based at least in part on one or more criteria. For example, the one or more criteria may include a degree of overlap of coverage areas of the adjacent beam set and the selected beam set, adjacency of the coverage areas of the adjacent beam set and the selected beam set, relative strength of a measurement associated with the selected beam set and the adjacent beam set, relative strength of a measurement on the adjacent beam set in a coverage area of the selected beam set, and/or the like. In some cases, each of the one or more criteria may be associated with a respective threshold. For example, a threshold degree of overlap, a threshold adjacency of the coverage areas (e.g., a threshold based at least in part on angular displacement of the coverage areas relative to each other, a threshold based at least in part on a length of a shared border of the coverage areas, a threshold, and/or the like), a threshold relative strength of the measurement, or a combination thereof, may be used as the one or more criteria. In some aspects, the processing device 130 may identify multiple adjacent beam sets (e.g., N adjacent beam sets, where N is any nonnegative integer). In some aspects, the processing device 130 may identify an adjacent beam set including a same number of beams as a selected beam set. In some aspects, the processing device 130 may identify an adjacent beam set with a different number of beams than the selected beam set. For example, the processing device 130 may identify an adjacent beam set with fewer beams (e.g., which may be useful when coverage is good in order to conserve resources of the UE 120) or with more beams (e.g., which may be useful when coverage is poor in order to improve radio performance of the UE 120). In some deployments, one or more beams may be situated between an adjacent beam set and a corresponding serving beam set. An adjacent beam set does not necessarily refer to a set of beams that are directly adjacent to beams of a serving beam set (e.g., with no intervening beams between the set of beams of the adjacent beam set and the beams of the serving beam set). Rather, an adjacent beam set is defined by the metrics described elsewhere herein relating to the coverage area of the adjacent beam set and the serving beam set.

In some aspects, the processing device 130 may identify an adjacent beam set based at least in part on a coverage hole. In some aspects, the processing device 130 may identify one or more coverage holes of the UE 120. A coverage hole is an area (e.g., on a sphere surrounding the UE 120) in which no beam set achieves a performance that satisfies a coverage threshold. In other words, a coverage hole is an area in which no beam achieves satisfactory performance. For an example of a coverage hole, refer to FIG. 4.

In some aspects, the processing device 130 may take a coverage hole into account when identifying adjacent beam sets. For example, the processing device 130 may exclude a coverage hole from the determination of coverage areas described above, which conserves resources of the processing device 130 that would otherwise be used to attempt to identify an adjacent beam pair in a coverage hole.

As shown by reference number 150, the processing device 130 may provide information indicating that the group of adjacent beam sets are associated with the selected beam set. For example, the processing device 130 may provide information identifying a selected beam set and the group of adjacent beam sets associated with the selected beam set. In some aspects, the processing device 130 may provide information identifying respective adjacent beam sets for multiple selected beam sets of the UE 120 (e.g., each potential serving beam set, a most likely set of beam sets, and/or the like).

In some aspects, the processing device 130 may generate a codebook. The UE 120 may use a codebook to generate the plurality of beams. The codebook may identify codewords to be used by the UE 120 to generate the plurality of beams and/or information associated with the plurality of beams, such as information identifying adjacent beam sets for selected beam sets of the plurality of beams. In this case, the codebook may include the information indicating that the group of adjacent beam sets are associated with the selected beam set.

In some aspects, the processing device 130 or the UE 120 may generate a measurement schedule. In some aspects, the processing device 130 may provide the information indicating that the group of adjacent beam sets are associated with the selected beam set, and the UE 120 may generate a measurement schedule based at least in part on the information. In some aspects, the processing device 130 may generate the measurement schedule, and may provide the measurement schedule (e.g., to the UE 120, for loading on the UE 120, and/or the like). In some aspects, the processing device 130 may determine ranks for the group of adjacent beam sets (e.g., ranks indicating priorities of the group of adjacent beam sets relative to each other). In such a case, the processing device 130 may provide information indicating the ranks, and the UE 120 may generate the measurement schedule based at least in part on the ranks. For example, the measurement schedule may be configured to prioritize measurement on beam sets in order of the beam sets' ranks, based at least in part on the beam sets' ranks, and/or the like.

In some aspects, the measurement schedule may prioritize the group of adjacent beam sets for measurement. For example, the measurement schedule may indicate that the UE 120 is to perform measurement on the one or more adjacent beam sets before performing measurement on a non-adjacent beam set, that the UE 120 is to perform measurement on all adjacent beam sets before performing measurement on any non-adjacent beam set, and/or the like. Measurement according to the measurement schedule is described in more detail in connection with FIG. 5.

In some aspects, a UE 120 may perform one or more of the operations described above in association with determining adjacent beam sets and/or generating a measurement schedule based at least in part on the adjacent beam sets. For example, the UE 120 may perform self-testing or loop-back testing (e.g., based at least in part on transmit feedback (TXFB) in a transceiver of the UE 120, mm Wave radar self-tests, and/or the like) to determine measurements for a plurality of beams, to associate classes with the plurality of beams, to generate adjacent beam sets from the plurality of beams, and/or to generate a measurement schedule based at least in part on the adjacent beam sets.

As indicated above, FIG. 1 is provided as an example. Other examples may differ from what is described with regard to FIG. 1.

Figure 2:
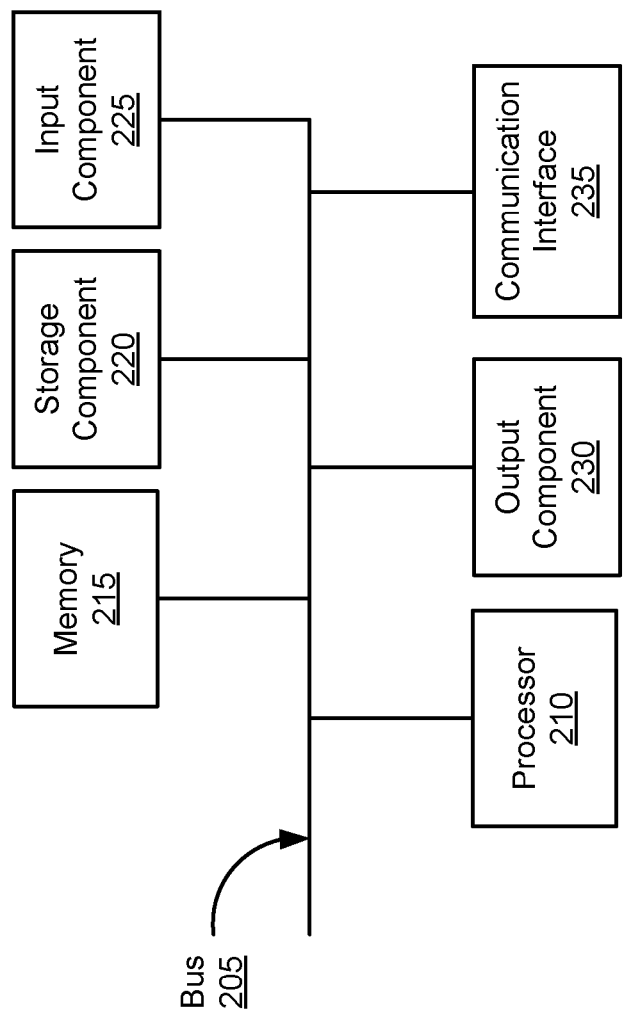
FIG. 2 is a diagram conceptually illustrating example components of one or more devices shown in FIG. 1, such as a wireless communication device or a processing device, in accordance with various aspects of the present disclosure.

FIG. 2 is a diagram of example components of a device 200. Device 200 may correspond to UE 120 and/or processing device 130. Additionally, or alternatively, UE 120 and/or processing device 130 may include one or more devices 200 and/or one or more components of device 200. As shown in FIG. 2, device 200 may include a bus 205, a processor 210, a memory 215, a storage component 220, an input component 225, an output component 230, and a communication interface 235.

Bus 205 includes a component that permits communication among the components of device 200. Processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), a baseband processor, an intermediate frequency processor, a receive processor, a transmit processor, a controller, and/or another type of processing component. Processor 210 is implemented in hardware, firmware, or a combination of hardware and software. In some aspects, processor 210 includes one or more processors capable of being programmed to perform a function.

Memory 215 includes a random-access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a sensor for sensing information (e.g., an image sensor, a location sensor, an accelerometer, a gyroscope, an actuator, and/or the like). In some aspects, input component 225 may include a camera (e.g., a high-resolution camera, a low-resolution camera, and/or the like). Output component 230 includes a component that provides output from device 200 (e.g., a display, a speaker, and/or one or more light-emitting diodes (LEDs)).

Communication interface 235 includes a transceiver and/or a separate receiver and transmitter that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency (RF) interface, a universal serial bus (USB) interface, a Wi-Fi interface, a cellular network interface, a wireless modem, an integrated circuit (IC), an inter-integrated circuit (I2C), a serial peripheral interface (SPI), or the like. In some aspects, communication interface 235 may include an antenna array or a set of antenna subarrays that may be configured with multiple antenna elements for multiple-input multiple-output (MIMO) or massive MIMO deployments that can occur in millimeter wave (mm Wave or mmW) communication systems. These antenna arrays or subarrays may perform beamforming to achieve improved array gain relative to omnidirectional transmission.

Device 200 may perform one or more processes described herein. Device 200 may perform these processes in response to processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, processor 210 of UE 120, processor 210 of processing device 130, and/or any other component(s) of FIG. 2 may perform one or more techniques associated with adjacent beam determination or measurement, as described in more detail elsewhere herein. For example, processor 210 and/or any other component(s) of FIG. 2 may perform or direct operations of, for example, process 600 of FIG. 6, process 700 of FIG. 7, and/or other processes as described herein.

In some aspects, the UE 120 may include a variety of means or components for implementing processing and/or communication functions. For example, the variety of means may include means for communicating via a serving beam set of the UE, the serving beam set being one or more beams of a plurality of beams. In some aspects, the variety of means may include means for performing a measurement on or measuring another beam set in accordance with a measurement schedule. In some aspects, the measurement schedule is configured to prioritize measurement on one or more adjacent beam sets associated with the serving beam set over measurement on one or more non-adjacent beam sets associated with the serving beam set. For example, the measurement schedule may prioritize measurements on one or more adjacent beam sets associated with the serving beam set over the measurement on one or more non-adjacent beam sets associated with the serving beam set. In some arrangements, the one or more adjacent beam sets may be associated with one or more coverage areas that at least partially overlap a coverage area of the serving beam set or are adjacent to a coverage area of the serving beam set. In some aspects, the one or more adjacent beam sets are associated with a measurement value that satisfies a threshold in the coverage area of the serving beam set. In some aspects, the variety of means may include means for determining the measurement schedule based at least in part on information indicating that the one or more adjacent beam sets are adjacent to the serving beam set; and/or the like. In some aspects, the UE 120 may include a variety of structural components for carrying out functions of the various means. For example, structural components that carry out functions of such means may include one or more components of the UE 120 described in connection with FIG. 2, such as bus 205, processor 210, memory 215, storage component 220, input component 225, output component 230, communication interface 235, and/or any combination thereof.

In some aspects, the processing device 130 may include a variety of means or components for implementing processing and/or communication functions. For example, the variety of means may include means for receiving measurement information pertaining to a measurement for a plurality of beams generated by a UE. In some aspects, the variety of means may include means for identifying a coverage area of a selected beam set of the plurality of beams based at least in part on the measurement information. In some aspects, the variety of means may include means for identifying a group of adjacent beam sets associated with the selected beam set based at least in part on the coverage area and based at least in part on respective coverage areas of the group of adjacent beam sets, wherein the group of adjacent beam sets includes one or more beams of the plurality of beams. In some aspects, the variety of means may include means for providing information indicating that the group of adjacent beam sets are associated with the selected beam set; means for identifying a coverage hole of the UE using the measurement information, wherein the coverage hole is excluded from the coverage area of the selected beam set and the respective coverage areas for identification of the group of adjacent beam sets. In some aspects, the variety of means may include means for assigning one or more classes to each beam of the plurality of beams, wherein the group of adjacent beam sets is identified as associated with the selected beam set based at least in part on the group of adjacent beam sets and the selected beam set being associated with a same class of the one or more classes. In some aspects, the variety of means may include means for identifying one or more respective adjacent beam sets for each beam set that can be generated from the plurality of beams; means for determining ranks for the group of adjacent beam sets, wherein the information indicating that the group of adjacent beam sets are associated with the selected beam set indicates the ranks. In some aspects, the processing device 130 may include a variety of structural components for carrying out functions of the various means. For example, structural components that carry out functions of such means may include one or more components of the processing device 130 described in connection with FIG. 2, such as bus 205, processor 210, memory 215, storage component 220, input component 225, output component 230, communication interface 235, and/or any combination thereof.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
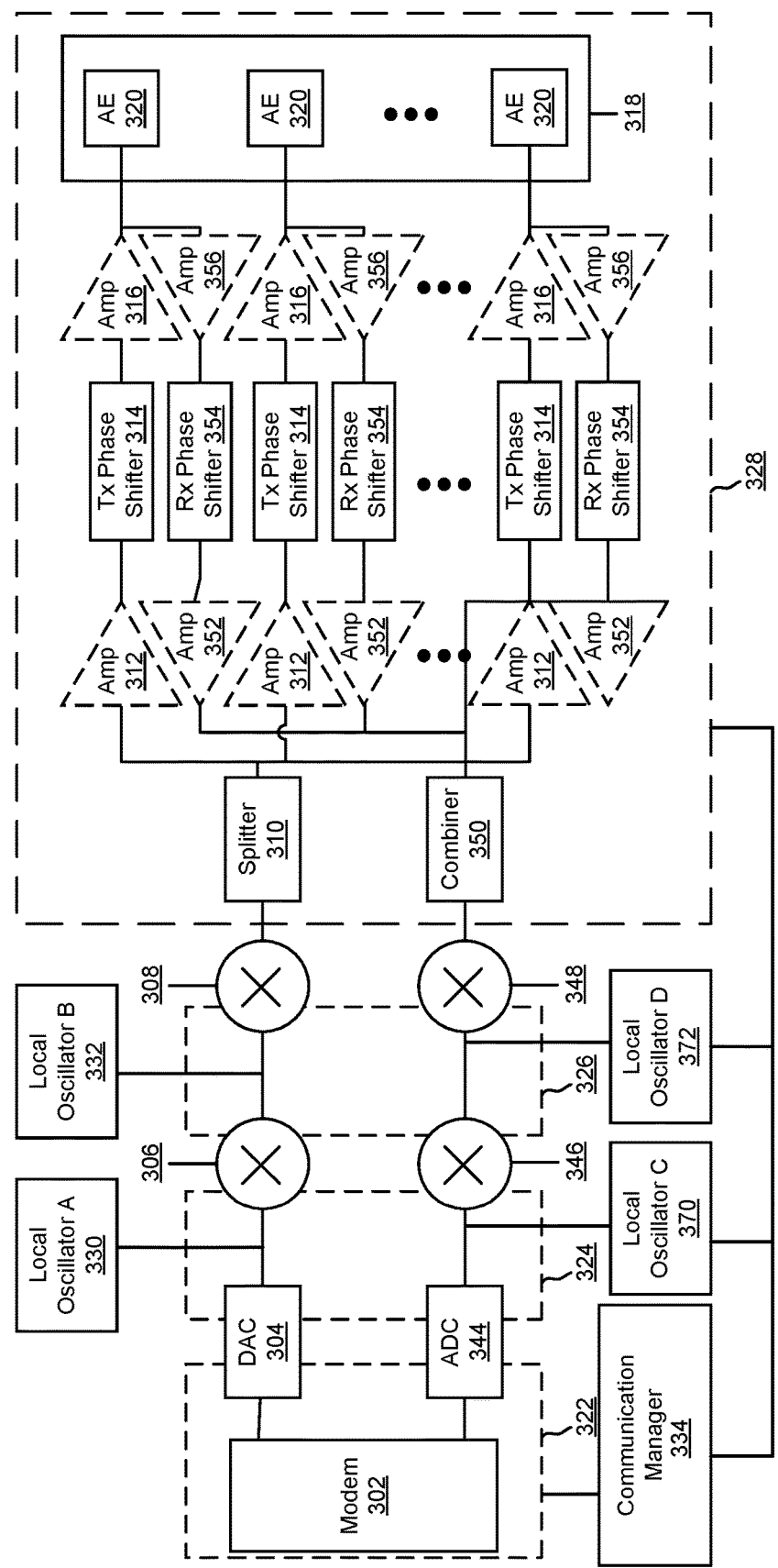
FIG. 3 is a diagram illustrating an example beamforming architecture 300 that supports beamforming for millimeter wave (mmW) communications, in accordance with various aspects of the present disclosure.

FIG. 3 is a diagram illustrating an example beamforming architecture 300 that supports beamforming for millimeter wave (mmW) communications, in accordance with various aspects of the present disclosure. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a communication manager 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the communication manager 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 314 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the communication manager 334) to provide independent control of the gain for each antenna element 320. For example, the modem 302 and/or the communication manager 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the communication manager 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the communication manager 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the communication manager 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. In some aspects, a set of beams, such as a beam pair, a beam trio, and so on, may be generated (e.g., at different polarities), which may improve communication performance of the architecture 300. The communication manager 334 may be located partially or fully within one or more other components of the architecture 300. For example, the communication manager 334 may be located within the modem 302 in some aspects. In some aspects, the communication manager 334 and/or the modem 302 may manage measurement of beam sets (e.g., individual beams, beam pairs, beam trios, and so on) in accordance with a measurement schedule, as described elsewhere herein.

As indicated above, FIG. 3 is provided as an example. Other examples may differ from what is described with regard to FIG. 3.

Figure 4:
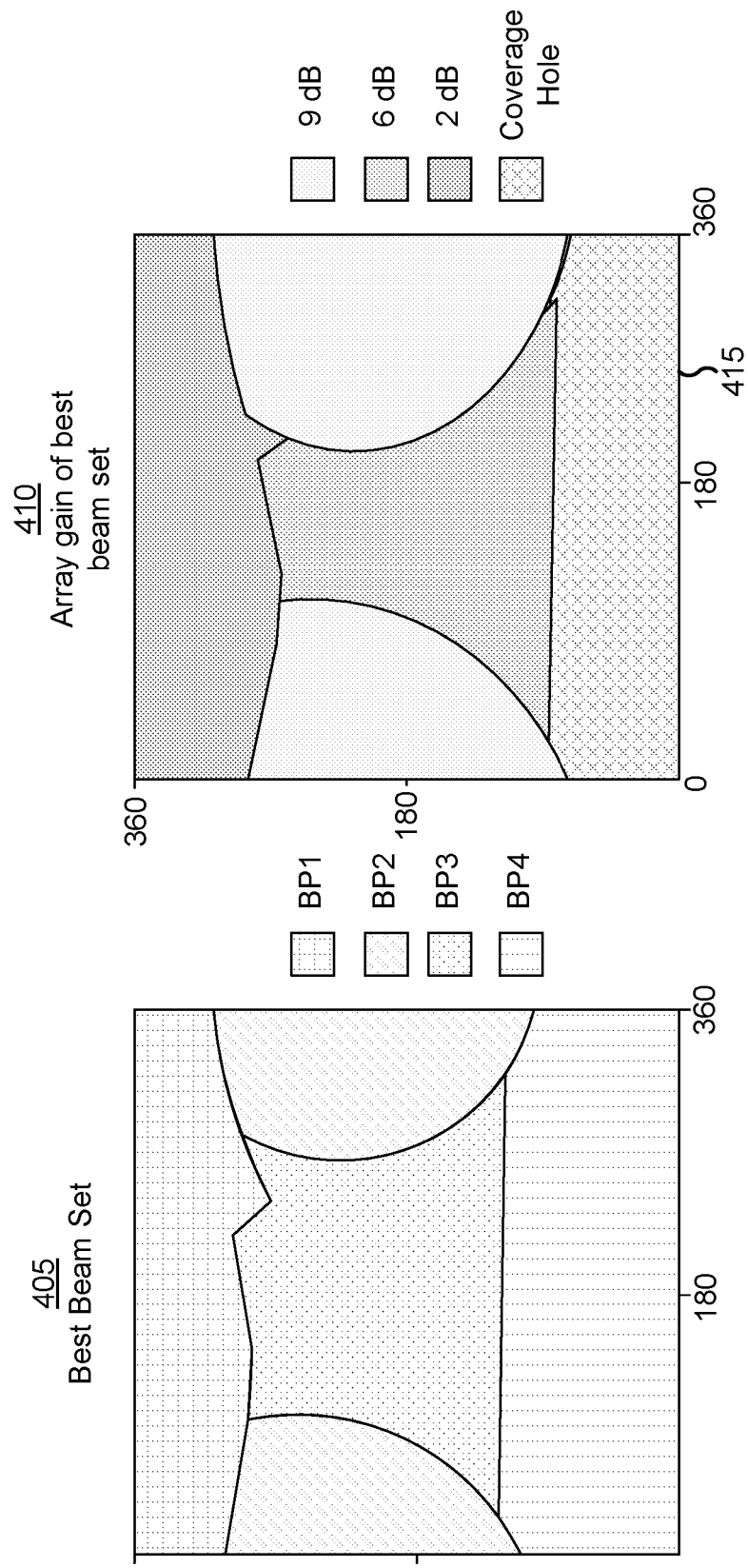
FIG. 4 is a diagram conceptually illustrating an example of a beam pair map and a beam pair array gain map, in accordance with various aspects of the present disclosure.

FIG. 4 is a diagram conceptually illustrating an example 400 of a beam set map 405 and a beam set array gain map 410, in accordance with various aspects of the present disclosure. The maps shown in FIG. 4 show a flat mapping of the sphere of electric field around the UE 120. Generally, array gain (also referred to as a beamforming gain) may refer to a gain achieved by the use of coherent combining of multiple antenna signals to focus a beam to a coverage area. In some aspects, array gain may be measured in terms of decibels relative to isotropic (dBi).

A selected beam set at each point on the sphere around the UE 120 is shown by the beam set map 405. The beam set map 405 illustrates which beam set, of multiple beam sets generated by the UE 120, provides a best performance, according to a metric, at each point of the sphere of the electric field around the UE 120. For example, a selected beam set may be selected at a given point based at least in part on the selected beam set being associated with a better metric (e.g., a higher RSRP, a higher SINR, a better coverage metric) than one or more other beam pairs at the given point. A given beam set, of BP1 through BP4 (which stand for "beam pair 1" through "beam pair 4," in this case), provides the best performance for the UE 120 relative to the other beam sets of BP1 through BP4 at the area of the beam set map 405 that is illustrated as corresponding to the given beam set. As used herein, a selected beam set may refer to a beam set that maximizes any one or more of the metrics used to generate the map 410. A coverage area of a beam set may or may not coincide with the selected beam set area of the beam set shown in FIG. 4. For example, a coverage area of a beam set may be equal to the selected beam set area of that beam set, or may be larger or smaller than the selected beam set area of that beam set. A maximal array gain for any beam set (out of BP1 through BP4) is shown for each point of the sphere by the beam set array gain map 410. It should be understood that any measurement, such as a beamforming gain, a combining gain, a magnitude, and/or the like, can be used to generate the map 410. Note that the map 410 includes a coverage hole, shown by reference number 415. The coverage hole may be an area in which no beam set, of BP1 through BP4, is associated with a measurement that satisfies a coverage hole threshold.

As indicated above, FIG. 4 is provided as an example. Other examples may differ from what is described with respect to FIG. 4.

Figure 5:
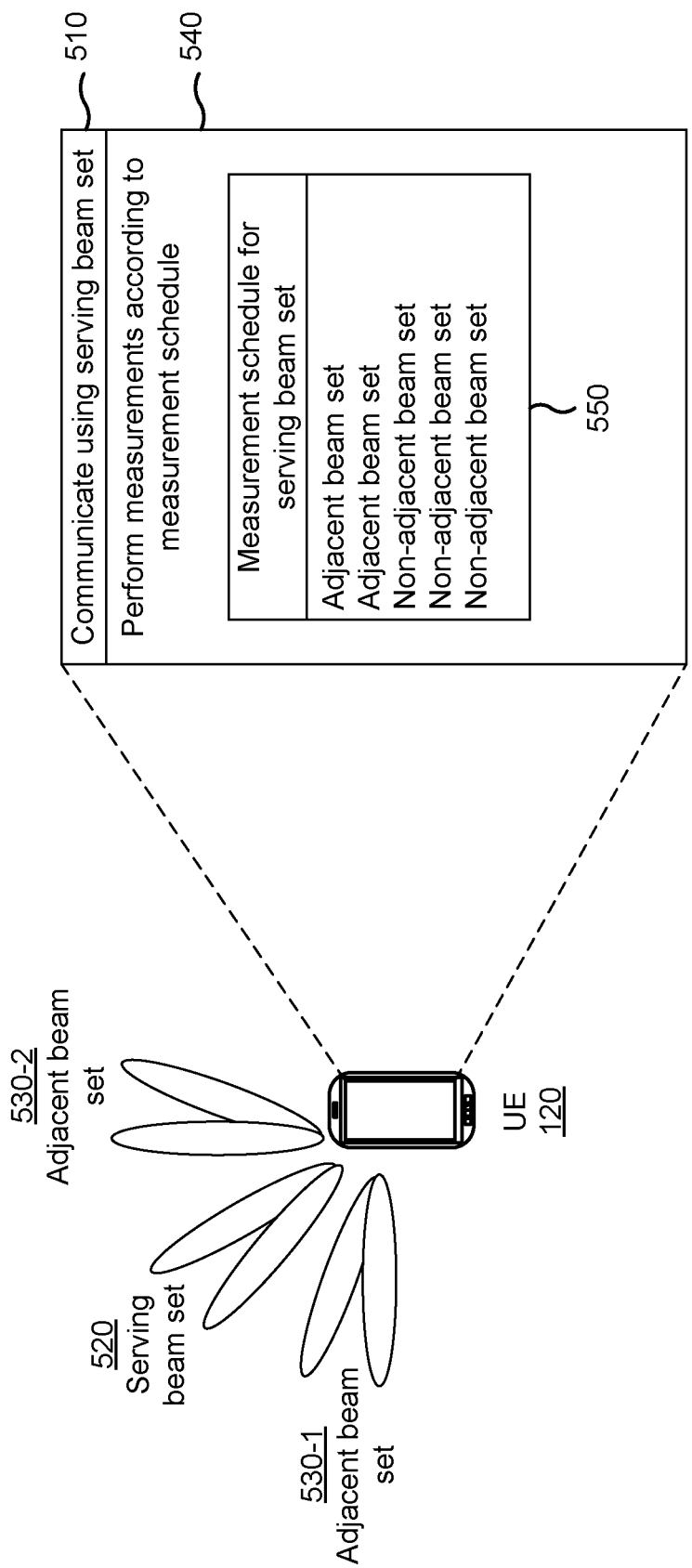
FIG. 5 is a diagram illustrating an example of adjacent beam measurement in accordance with a measurement schedule, in accordance with various aspects of the present disclosure.

FIG. 5 is a diagram illustrating an example 500 of adjacent beam measurement in accordance with a measurement schedule, in accordance with various aspects of the present disclosure. As shown, FIG. 5 includes a UE 120. For example, the UE 120 may be a UE 120 for which the processing device 130 determined a codebook and/or a group of adjacent beam sets, as described in more detail in connection with FIG. 1.

As shown in FIG. 5, and by reference number 510, the UE 120 may communicate using a serving beam set. The serving beam set is shown by reference number 520. The serving beam set may be associated with a group of adjacent beam sets, shown by reference numbers 530-1 and 530-2. While the serving beam set 520 and the adjacent beam sets 530-1 and 530-2 are illustrated using beams that are relatively close to each other in angular displacement, the beams of a beam set can have any angular displacement from each other. As shown by reference number 540, the UE 120 may perform measurements according to a measurement schedule. For example, the UE 120 may perform the measurement to identify suitable beam set candidates for the UE 120. The measurement schedule is shown by reference number 550. The measurement schedule may identify beam sets for which measurements are to be performed and an order in which the measurements are to be performed. The measurements may include any measurement used to identify a suitable beam set, such as a reference signal received power (RSRP) measurement, a measurement involving a physical broadcast channel, and/or the like. As shown, the measurement schedule may indicate that adjacent beam set measurements are to be prioritized over non-adjacent beam set measurements. Thus, the UE 120 may prioritize measurements on adjacent beam sets over those on non-adjacent beam sets, thereby reducing the time and resources involved in finding suitable beam sets.

As indicated above, FIG. 5 is provided as an example. Other examples may differ from what is described with respect to FIG. 5.

Figure 6:
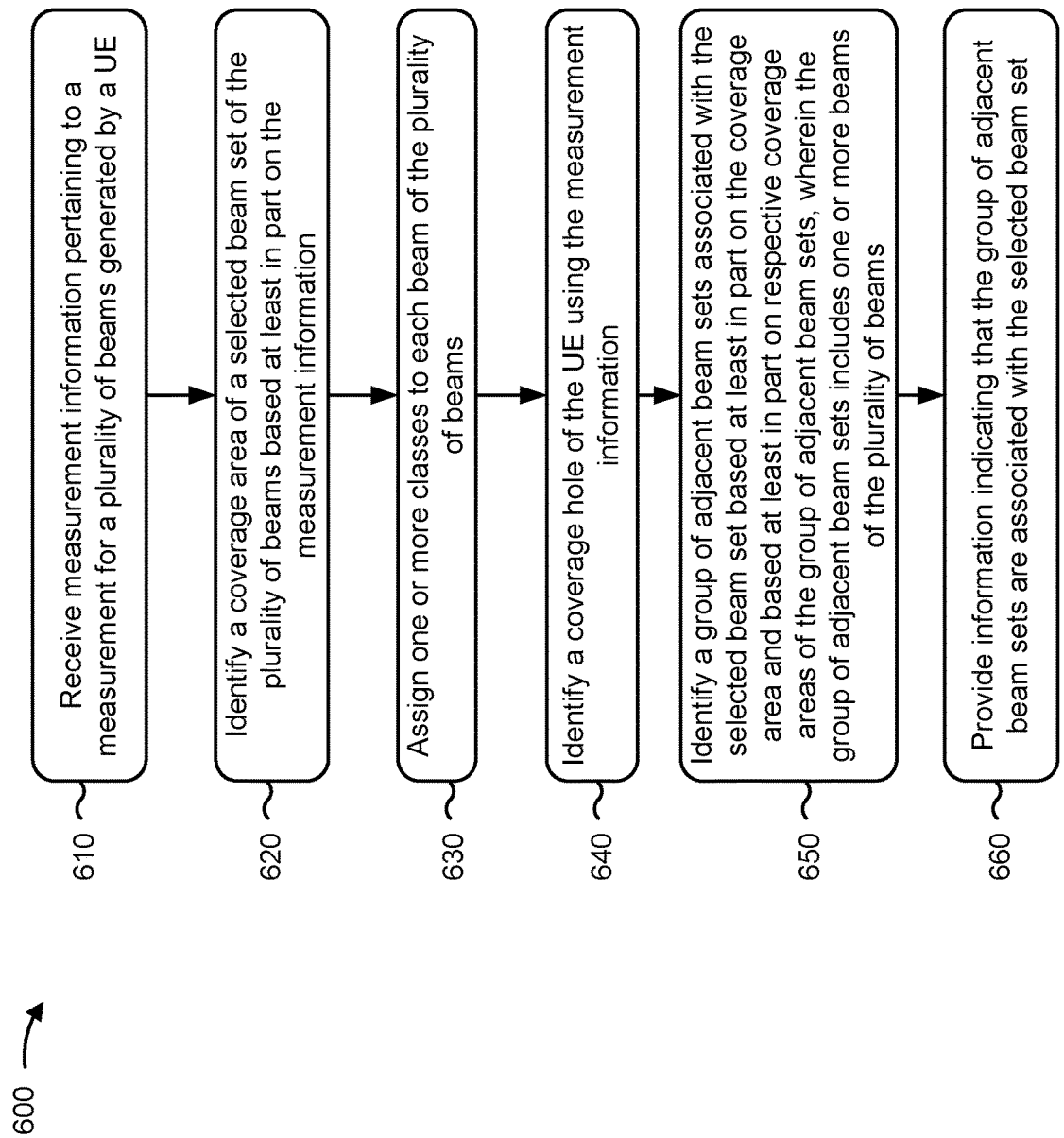
FIG. 6 is a diagram illustrating an example process performed, for example, by a device, in accordance with various aspects of the present disclosure.

FIG. 6 is a diagram illustrating an example process 600 performed, for example, by a device, in accordance with various aspects of the present disclosure. Example process 600 is an example where a device (e.g., processing device 130 and/or the like) performs operations associated with adjacent beam determination.

As shown in FIG. 6, in some aspects, process 600 may include receiving measurement information pertaining to a measurement for a plurality of beams generated by a UE (block 610). For example, the device (e.g., using the processor 210, the memory 215, the input component 225, the communication interface 235, and/or the like) may receive measurement information pertaining to a measurement for a plurality of beams generated by a UE, as described above.

As further shown in FIG. 6, in some aspects, process 600 may include identifying a coverage area of a selected beam set of the plurality of beams based at least in part on the measurement information (block 620). For example, the device (e.g., using the processor 210, the memory 215, and/or the like) may identify a coverage area of a selected beam set of the plurality of beams based at least in part on the measurement information, as described above.

As further shown in FIG. 6, in some aspects, process 600 may optionally include assigning one or more classes to each beam of the plurality of beams (block 630). For example, the device (e.g., using the bus 205, the processor 210, the memory 215, the storage component 220, the input component 225, the output component 230, the communication interface 235, and/or the like) may assign one or more classes to each beam of the plurality of beams, as described above. In some aspects, the group of adjacent beam sets may be identified as associated with the selected beam set based at least in part on the group of adjacent beam sets and the selected beam set being associated with a same class of the one or more classes.

As further shown in FIG. 6, in some aspects, process 600 may optionally include identifying a coverage hole of the UE using the measurement information (block 640). For example, the device (e.g., using the processor 210, the memory 215, and/or the like) may identify a coverage hole of the UE using the measurement information, as described above. In some aspects, the coverage hole is excluded from the coverage area of the selected beam set and the respective coverage areas for identification of the group of adjacent beam sets.

As further shown in FIG. 6, in some aspects, process 600 may include identifying a group of adjacent beam sets associated with the selected beam set based at least in part on the coverage area and based at least in part on respective coverage areas of the group of adjacent beam sets, wherein the group of adjacent beam sets includes one or more beams of the plurality of beams (block 650). For example, the device (e.g., using the processor 210, the memory 215, and/or the like) may identify a group of adjacent beam sets associated with the selected beam set based at least in part on the coverage area and based at least in part on respective coverage areas of the group of adjacent beam sets, as described above. In some aspects, the group of adjacent beam sets includes one or more beams of the plurality of beams. The various techniques and apparatuses described herein may be applied for all beam sets of a UE. For example, the device may determine respective groups of adjacent beam sets for all beam sets of the UE.

As further shown in FIG. 6, in some aspects, process 600 may include providing information indicating that the group of adjacent beam sets are associated with the selected beam set (block 660). For example, the device (e.g., using the processor 210, the memory 215, the communication interface 235, and/or the like) may provide information indicating that the group of adjacent beam sets are associated with the selected beam set, as described above.

Process 600 may include additional aspects, such as any single aspect or any combination of aspects described below and/or in connection with one or more other processes described elsewhere herein.

In a first aspect, the coverage area of the selected beam set is identified based at least in part on beamforming gain values or combining gain values for the plurality of beams.

In a second aspect, alone or in combination with the first aspect, the device may identify a coverage hole of the UE using the measurement information, wherein the coverage hole is excluded from the coverage area of the selected beam set and the respective coverage areas for identification of the group of adjacent beam sets.

In a third aspect, alone or in combination with one or more of the first and second aspects, the device may assign one or more classes to each beam of the plurality of beams, wherein the group of adjacent beam sets is identified as associated with the selected beam set based at least in part on the group of adjacent beam sets and the selected beam set being associated with a same class of the one or more classes.

In a fourth aspect, alone or in combination with one or more of the first through third aspects, the one or more classes are based at least in part on at least one of: beam widths of the plurality of beams, whether the plurality of beams are associated with one or more side lobes, directions of the plurality of beams, beamforming gains of the plurality of beams, combining gains of the plurality of beams, directivity of the plurality of beams, coverage areas of the plurality of beams, phases of the plurality of beams, performance of the plurality of beams, or power consumption of the plurality of beams.

In a fifth aspect, alone or in combination with one or more of the first through fourth aspects, a particular adjacent beam set is identified as one of the one or more adjacent beam sets based at least in part on a coverage area of the particular adjacent beam set at least partially overlapping the coverage area of the selected beam set.

In a sixth aspect, alone or in combination with one or more of the first through fifth aspects, a particular adjacent beam set is identified as one of the one or more adjacent beam sets based at least in part on a coverage area of the particular adjacent beam set being adjacent to the coverage area of the selected beam set.

In a seventh aspect, alone or in combination with one or more of the first through sixth aspects, a particular adjacent beam set is identified as one of the one or more adjacent beam sets based at least in part on the particular adjacent beam set being associated with a measurement value that satisfies a threshold in the coverage area of the selected beam set.

In an eighth aspect, alone or in combination with one or more of the first through seventh aspects, the device may identify one or more respective adjacent beam sets for each beam set that can be generated from the plurality of beams.

In a ninth aspect, alone or in combination with one or more of the first through eighth aspects, the device may determine ranks for the group of adjacent beam sets, wherein the information indicating that the group of adjacent beam sets are associated with the selected beam set indicates the ranks for the group of adjacent beam sets.

In a tenth aspect, alone or in combination with one or more of the first through ninth aspects, the information indicating that the group of adjacent beam sets are associated with the selected beam set indicates one or more measurement priorities of the group of adjacent beam sets.

In an eleventh aspect, alone or in combination with one or more of the first through tenth aspects, the selected beam set is a single beam of the plurality of beams.

In a twelfth aspect, alone or in combination with one or more of the first through eleventh aspects, the selected beam set is a beam pair of the plurality of beams.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
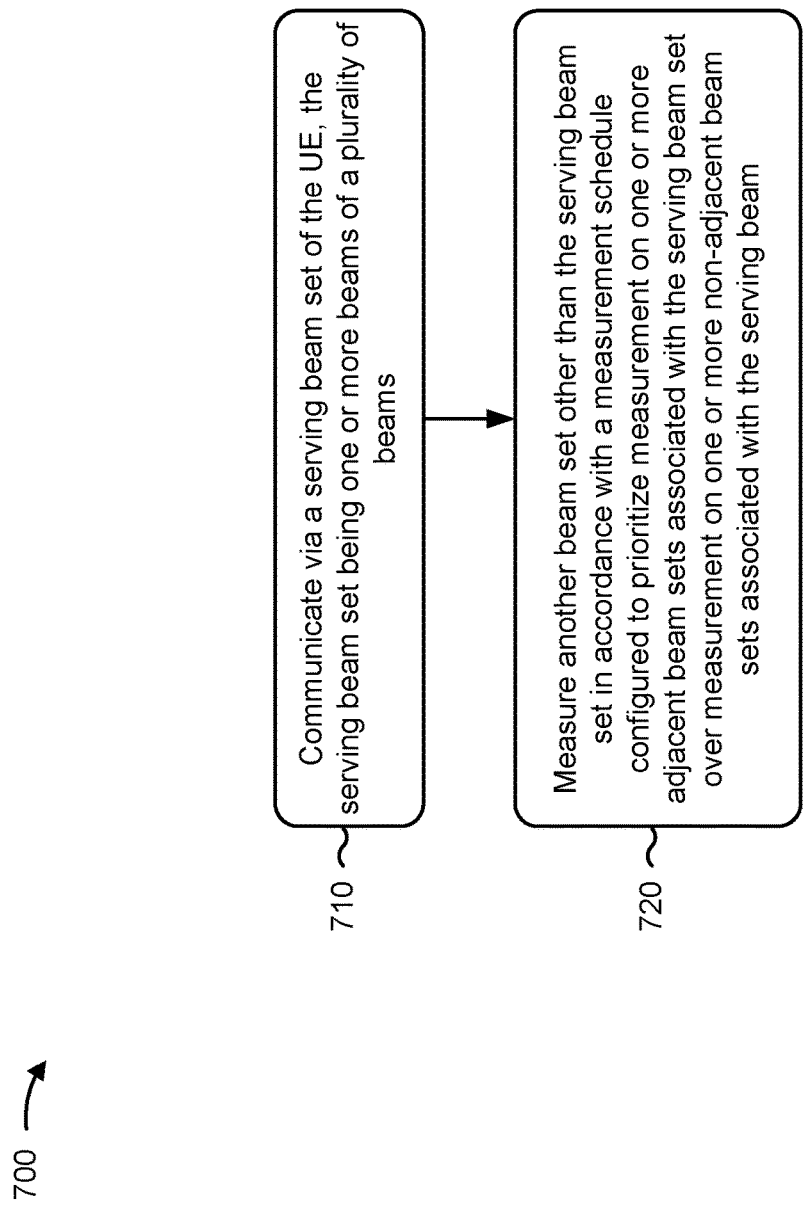
FIG. 7 is a diagram illustrating an example process performed, for example, by a user equipment, in accordance with various aspects of the present disclosure.

FIG. 7 is a diagram illustrating an example process 700 performed, for example, by a user equipment, in accordance with various aspects of the present disclosure. Example process 700 is an example where a UE (e.g., UE 120 and/or the like) performs operations associated with adjacent beam determination.

As shown in FIG. 7, in some aspects, process 700 may include communicating via a serving beam set of the UE, the serving beam set being one or more beams of a plurality of beams (block 710). For example, the user equipment (e.g., using the processor 210, the memory 215, the communication interface 235, one or more of the components shown by reference number 328 of FIG. 3, and/or the like) may communicate using a serving beam set of the UE, as described above. In some aspects, the serving beam set uses one or more beams of a plurality of beams. In some aspects, the UE may communicate via a serving beam of a UE (e.g., a wireless communication device), the serving beam being a beam of a plurality of beams.

As further shown in FIG. 7, in some aspects, process 700 may include measuring another beam set in accordance with a measurement schedule configured to prioritize measurement on one or more adjacent beam sets associated with the serving beam set over measurement on one or more non-adjacent beam sets associated with the serving beam set (block 720). For example, the user equipment (e.g., using the processor 210, the memory 215, the communication interface 235, one or more of the components shown by reference number 328 of FIG. 3, and/or the like) may measure another beam set other than the serving beam set in accordance with a measurement schedule, as described above. The measurement may include an RSRP measurement (e.g., L1-RSRP), an SINR measurement (e.g., L1-SINR), or a similar measurement. In some aspects, the measurement schedule is configured to prioritize measurement on one or more adjacent beam sets associated with the serving beam over measurement on one or more non-adjacent beam sets associated with the serving beam set. For example, the one or more adjacent beam sets may be associated with a higher measurement priority than the one or more non-adjacent beam sets in the measurement schedule. In some aspects, the one or more adjacent beam sets are associated with one or more coverage areas that at least partially overlap a coverage area of the serving beam set, or are adjacent to a coverage area of the serving beam set. In some aspects, the one or more adjacent beam sets may be associated with a measurement value that satisfies a threshold in the coverage area of the serving beam set. In some aspects, the UE may measure one or more of a plurality beams according to a measurement beam schedule configured to prioritize adjacent beams over non-adjacent beams.

Process 700 may include additional aspects, such as any single aspect or any combination of aspects described below and/or in connection with one or more other processes described elsewhere herein.

In a first aspect, the measurement schedule prioritizes the measurement on all adjacent beam sets of the serving beam set over the measurement on any non-adjacent beam set of the serving beam set.

In a second aspect, alone or in combination with the first aspect, the one or more non-adjacent beam sets are associated with one or more coverage areas that do not overlap the coverage area of the serving beam set, or are not adjacent to the coverage area of the serving beam set. In some aspects, the one or more non-adjacent beam sets are associated with one or more coverage areas that are associated with a measurement value that fails to satisfy a threshold in the coverage area of the serving beam set.

In a third aspect, alone or in combination with one or more of the first and second aspects, a particular adjacent beam set is identified as one of the one or more adjacent beam sets based at least in part on a coverage area of the particular adjacent beam set at least partially overlapping the coverage area of the serving beam set.

In a fourth aspect, alone or in combination with one or more of the first through third aspects, a particular adjacent beam set is identified as one of the one or more adjacent beam sets based at least in part on a coverage area of the particular adjacent beam set being adjacent to the coverage area of the serving beam set.

In a fifth aspect, alone or in combination with one or more of the first through fourth aspects, a particular adjacent beam set is identified as one of the one or more adjacent beam sets based at least in part on the particular adjacent beam set being associated with a measurement value that satisfies a threshold in the coverage area of the serving beam set.

In a sixth aspect, alone or in combination with one or more of the first through fifth aspects, the serving beam set is a single beam of the plurality of beams.

In a seventh aspect, alone or in combination with one or more of the first through sixth aspects, the serving beam set is a beam pair of the plurality of beams.

In an eighth aspect, alone or in combination with one or more of the first through seventh aspects, the UE may determine the measurement schedule based at least in part on information indicating that the one or more adjacent beam sets are adjacent to the serving beam set.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

In the following, further examples are provided having a variety of features.

In a first example, a method of wireless communication performed by a user equipment (UE), comprises communicating using a serving beam set of the UE, wherein the serving beam set uses one or more beams of a plurality of beams. In some aspects, the method comprises performing a measurement on another beam set in accordance with a measurement schedule. The measurement schedule may indicate that one or more adjacent beam sets associated with the serving beam set have a higher measurement priority than one or more non-adjacent beam sets associated with the serving beam set. In some aspects, the one or more adjacent beam sets are associated with one or more coverage areas that at least partially overlap a coverage area of the serving beam set, or are adjacent to the coverage area of the serving beam set. In some aspects, the one or more adjacent beam sets are associated with a measurement value that satisfies a threshold in the coverage area of the serving beam set.

In a second example, the measurement schedule of the first example indicates that all adjacent beam sets of the serving beam set are associated with a higher measurement priority than any non-adjacent beam set of the serving beam set. In a third example, alone or in combination with the first example and/or the second example, the one or more non-adjacent beam sets are associated with one or more coverage areas that do not overlap the coverage area of the serving beam set, are not adjacent to the coverage area of the serving beam set, or are associated with a measurement value that fails to satisfy a threshold in the coverage area of the serving beam set.

In a fourth example, alone or in combination with one or more of the first through third examples, a particular adjacent beam set is identified as one of the one or more adjacent beam sets based at least in part on a coverage area of the particular adjacent beam set at least partially overlapping the coverage area of the serving beam set. In a fifth example, alone or in combination with one or more of the first through fourth examples, a particular adjacent beam set is identified as one of the one or more adjacent beam sets based at least in part on a coverage area of the particular adjacent beam set being adjacent to the coverage area of the serving beam set.

In a sixth example, alone or in combination with one or more of the first through third examples, a particular adjacent beam set is identified as one of the one or more adjacent beam sets based at least in part on the particular adjacent beam set being associated with a measurement value that satisfies a threshold in the coverage area of the serving beam set.

In a seventh example, alone or in combination with one or more of the first through sixth examples, the serving beam set is a single beam of the plurality of beams. In an eighth example, alone or in combination with one or more of the first through sixth examples, the serving beam set is a beam pair of the plurality of beams. In a ninth example, alone or in combination with one or more of the first through eighth examples, the method of the first example may include determining the measurement schedule based at least in part on information indicating that the one or more adjacent beam sets are adjacent to the serving beam set.

In a tenth example, a method of wireless communication performed by a device may include receiving measurement information pertaining to a measurement for a plurality of beams generated by a UE. The method may include identifying a coverage area of a selected beam set of the plurality of beams based at least in part on the measurement information. The method may also include identifying a group of adjacent beam sets associated with the selected beam set based at least in part on the coverage area and based at least in part on respective coverage areas of the group of adjacent beam sets. In some cases, the group of adjacent beam sets includes one or more beams of the plurality of beams. The method may include providing information indicating that the group of adjacent beam sets are associated with the selected beam set.

In an eleventh example, the coverage area of the selected beam set of the tenth example is identified based at least in part on beamforming gain values or combining gain values for the plurality of beams. In a twelfth example, the method of the tenth example and/or the eleventh example may include identifying a coverage hole of the UE using the measurement information. In some aspects, the coverage hole is excluded from the coverage area of the selected beam set and the respective coverage areas for identification of the group of adjacent beam sets. In a thirteenth example, alone or in combination with one or more of the tenth through twelfth examples, the group of adjacent beam sets is identified as associated with the selected beam set based at least in part on the group of adjacent beam sets and the selected beam set being associated with a same class.

In a fourteenth example, alone or in combination with one or more of the tenth through thirteenth examples, the one or more classes are based at least in part on beam widths of the plurality of beams. In some aspects, the one or more classes are based at least in part on whether the plurality of beams are associated with one or more side lobes. In some aspects, the one or more classes are based at least in part on directions of the plurality of beams. In some aspects, the one or more classes are based at least in part on beamforming gains of the plurality of beams. In some aspects, the one or more classes are based at least in part on combining gains of the plurality of beams. In some aspects, the one or more classes are based at least in part on directivity of the plurality of beams. In some aspects, the one or more classes are based at least in part on coverage areas of the plurality of beams. In some aspects, the one or more classes are based at least in part on phases of the plurality of beams. In some aspects, the one or more classes are based at least in part on performance of the plurality of beams. In some aspects, the one or more classes are based at least in part on power consumption of the plurality of beams. In some aspects, the one or more classes are based at least in part on a combination of two or more of the factors described in the fourteenth example.

In a fifteenth example, alone or in combination with one or more of the tenth through fourteenth examples, a particular adjacent beam set is identified as one of the group of adjacent beam sets based at least in part on a coverage area of the particular adjacent beam set at least partially overlapping the coverage area of the selected beam set. In a sixteenth example, alone or in combination with one or more of the tenth through fifteenth examples, a particular adjacent beam set is identified as one of the group of adjacent beam sets based at least in part on a coverage area of the particular adjacent beam set being adjacent to the coverage area of the selected beam set. In a seventeenth example, alone or in combination with one or more of the tenth through sixteenth examples, a particular adjacent beam set is identified as one of the group of adjacent beam sets based at least in part on the particular adjacent beam set being associated with a measurement value that satisfies a threshold in the coverage area of the selected beam set.

In an eighteenth example, alone or in combination with one or more of the tenth through seventeenth examples, the method of the tenth example may include identifying one or more respective adjacent beam sets for each beam set that can be generated from the plurality of beams. In a nineteenth example, alone or in combination with one or more of the tenth through eighteenth examples, the information indicating that the group of adjacent beam sets are associated with the selected beam set indicates ranks for the group of adjacent beam sets. In a twentieth example, alone or in combination with one or more of the tenth through nineteenth examples, the information indicating that the group of adjacent beam sets are associated with the selected beam set indicates one or more measurement priorities of the group of adjacent beam sets.

In a twenty-first example, alone or in combination with one or more of the tenth through twentieth examples, the selected beam set is a single beam of the plurality of beams. In a twenty-second example, alone or in combination with one or more of the tenth through twenty-first examples, the selected beam set is a beam pair of the plurality of beams.

In a twenty-third example, a UE for wireless communication includes a memory and one or more processors operatively coupled to the memory. The memory and the one or more processors may be configured to communicate using a serving beam set of the UE, wherein the serving beam set uses one or more beams of a plurality of beams. The memory and the one or more processors may be configured to perform a measurement on another beam set in accordance with a measurement schedule. The measurement schedule may indicates that one or more adjacent beam sets associated with the serving beam set are associated with a higher measurement priority than one or more non-adjacent beam sets associated with the serving beam set. The one or more adjacent beam sets may be associated with one or more coverage areas that at least partially overlap a coverage area of the serving beam set, are adjacent to the coverage area of the serving beam set, or are associated with a measurement value that satisfies a threshold in the coverage area of the serving beam set.

In a twenty-fourth example, the measurement schedule of the twenty-third example indicates that all adjacent beam sets of the serving beam set are associated with a higher measurement priority than any non-adjacent beam set of the serving beam set. In a twenty-fifth example, alone or in combination with one or more of the twenty-third and twenty-fourth examples, wherein the serving beam set is a single beam of the plurality of beams. In a twenty-sixth example, alone or in combination with one or more of the twenty-third through twenty-fifth examples, the serving beam set is a first beam pair of the plurality of beams and the other beam set is a second beam pair of the plurality of beams.

In a twenty-seventh example, a device for wireless communication may include a memory and one or more processors operatively coupled to the memory. The memory and the one or more processors may be configured to receive measurement information pertaining to a measurement for a plurality of beams generated by a UE. The memory and the one or more processors may be configured to identify a coverage area of a selected beam set of the plurality of beams based at least in part on the measurement information. The memory and the one or more processors may be configured to identify a group of adjacent beam sets associated with the selected beam set based at least in part on the coverage area and based at least in part on respective coverage areas of the group of adjacent beam sets. The group of adjacent beam sets may include one or more beams of the plurality of beams. The memory and the one or more processors may be configured to provide information indicating that the group of adjacent beam sets are associated with the selected beam set.

In a twenty-eighth example, the device of the twenty-seventh example may be configured to identify a coverage hole of the UE using the measurement information. The coverage hole may be excluded from the coverage area of the selected beam set and the respective coverage areas for identification of the group of adjacent beam sets.

In a twenty-ninth example, alone or in combination with one or more of the twenty-seventh and twenty-eighth examples, the group of adjacent beam sets is identified as associated with the selected beam set based at least in part on the group of adjacent beam sets and the selected beam set being associated with a same class.

In a thirtieth example, alone or in combination with one or more of the twenty-seventh through twenty-ninth examples, the device may be configured to identify one or more respective adjacent beam sets for multiple beam sets that can be generated from the plurality of beams.

In a thirty-first example, a computer program may comprise instructions that, when performed on a computer, perform a method according to one of the first through twenty-second examples.

What is claimed is:
1. A device for wireless communication, comprising:
a memory; and
one or more processors communicatively coupled to the memory, wherein the one or more processors are configured to:
receive measurement information pertaining to a measurement for a plurality of beams generated by a user equipment (UE); and
measure a group of adjacent beam sets that are associated with a selected beam set of the plurality of beams,
wherein the group of adjacent beam sets is based at least in part on a coverage area of the selected beam set,
wherein the coverage area of the selected beam set is based at least in part on the measurement information,
wherein the group of adjacent beam sets includes one or more beams of the plurality of beams, and
wherein the group of adjacent beam sets is identified as associated with the selected beam set based at least in part on the group of adjacent beam sets and the selected beam set being associated with a same class.

2. The device of claim 1, wherein the coverage area of the selected beam set is identified based at least in part on beamforming gain values or combining gain values for the plurality of beams.

3. The device of claim 1, wherein a coverage hole is excluded from the coverage area of the selected beam set and the respective coverage areas for identification of the group of adjacent beam sets.

4. The device of claim 1, wherein the same class is based at least in part on at least one of:
- beam widths of the plurality of beams,
- whether the plurality of beams are associated with one or more side lobes,
- directions of the plurality of beams,
- beamforming gains of the plurality of beams,
- combining the gains of the plurality of beams,
- directivity of the plurality of beams,
- coverage areas of the plurality of beams,
- phases of the plurality of beams,
- performance of the plurality of beams, or
- power consumption of the plurality of beams.

5. The device of claim 1, wherein a particular adjacent beam set is identified as one of the group of adjacent beam sets based at least in part on a coverage area of the particular adjacent beam set at least partially overlapping the coverage area of the selected beam set.

6. The device of claim 1, wherein a particular adjacent beam set is identified as one of the group of adjacent beam sets based at least in part on a coverage area of the particular adjacent beam set being adjacent to the coverage area of the selected beam set.

7. The device of claim 1, wherein a particular adjacent beam set is identified as one of the group of adjacent beam sets based at least in part on the particular adjacent beam set being associated with a measurement value that satisfies a threshold in the coverage area of the selected beam set.

8. The device of claim 1, wherein the one or more processors are further configured to:
- identify one or more respective adjacent beam sets for each beam set that can be generated from the plurality of beams.

9. The device of claim 1, wherein the information indicating that the group of adjacent beam sets are associated with the selected beam set indicates ranks for the group of adjacent beam sets.

10. The device of claim 1, wherein the information indicating that the group of adjacent beam sets are associated with the selected beam set indicates one or more measurement priorities of the group of adjacent beam sets.

11. The device of claim 1, wherein the selected beam set is a single beam of the plurality of beams.

12. The device of claim 1, wherein the selected beam set is a beam pair of the plurality of beams.

13. A method of wireless communication performed by a device, comprising:
- receiving measurement information pertaining to a measurement for a plurality of beams generated by a user equipment (UE); and
- measuring a group of adjacent beam sets that are associated with a selected beam set of the plurality of beams,
  - wherein the group of adjacent beam sets is based at least in part on a coverage area of the selected beam set,
  - wherein the coverage area of the selected beam set is based at least in part on the measurement information,
  - wherein the group of adjacent beam sets includes one or more beams of the plurality of beams, and
  - wherein the group of adjacent beam sets is identified as associated with the selected beam set based at least in part on the group of adjacent beam sets and the selected beam set being associated with a same class.

14. The method of claim 13, wherein the coverage area of the selected beam set is identified based at least in part on beamforming gain values or combining gain values for the plurality of beams.

15. The method of claim 13, wherein a coverage hole is excluded from the coverage area of the selected beam set and the respective coverage areas for identification of the group of adjacent beam sets.

16. The method of claim 13, wherein a particular adjacent beam set is identified as one of the group of adjacent beam sets based at least in part on a coverage area of the particular adjacent beam set at least partially overlapping the coverage area of the selected beam set.

17. The method of claim 13, wherein a particular adjacent beam set is identified as one of the group of adjacent beam sets based at least in part on a coverage area of the particular adjacent beam set being adjacent to the coverage area of the selected beam set.

18. The method of claim 13, wherein the same class is based at least in part on at least one of:
- beam widths of the plurality of beams,
- whether the plurality of beams are associated with one or more side lobes,
- directions of the plurality of beams,
- beamforming gains of the plurality of beams,
- combining the gains of the plurality of beams,
- directivity of the plurality of beams,
- coverage areas of the plurality of beams,
- phases of the plurality of beams,
- performance of the plurality of beams, or
- power consumption of the plurality of beams.

19. A non-transitory computer-readable medium having instructions for wireless communication stored thereon that, when executed by a device, cause the device to:
- receive measurement information pertaining to a measurement for a plurality of beams generated by a user equipment (UE); and
- measure a group of adjacent beam sets that are associated with a selected beam set of the plurality of beams,
  - wherein the group of adjacent beam sets is based at least in part on a coverage area of the selected beam set,
  - wherein the coverage area of the selected beam set is based at least in part on the measurement information,
  - wherein the group of adjacent beam sets includes one or more beams of the plurality of beams, and
  - wherein the group of adjacent beam sets is identified as associated with the selected beam set based at least in part on the group of adjacent beam sets and the selected beam set being associated with a same class.

20. The non-transitory computer-readable medium of claim 19, wherein the same class is based at least in part on at least one of:
- beam widths of the plurality of beams,
- whether the plurality of beams are associated with one or more side lobes,
- directions of the plurality of beams,
- beamforming gains of the plurality of beams,
- combining the gains of the plurality of beams,
- directivity of the plurality of beams,
- coverage areas of the plurality of beams,
- phases of the plurality of beams,
- performance of the plurality of beams, or
- power consumption of the plurality of beams.

* * * * *